(12) United States Patent
Nishijima

(10) Patent No.: US 6,729,008 B2
(45) Date of Patent: May 4, 2004

(54) METHOD FOR ASSEMBLING VEHICLE BODY

(75) Inventor: Naoya Nishijima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 42 days.

(21) Appl. No.: 10/166,061

(22) Filed: Jun. 11, 2002

(65) Prior Publication Data
US 2002/0195839 A1 Dec. 26, 2002

(30) Foreign Application Priority Data
Jun. 20, 2001 (JP) ........................................ 2001-185857

(51) Int. Cl.$^7$ ................................................. B23P 25/00
(52) U.S. Cl. ........................ 29/458; 29/897.2; 29/464; 29/469; 296/193.04; 296/203.02
(58) Field of Search ................................ 29/897.2, 458, 29/464, 466, 469, 423; 296/193.04, 203.02

(56) References Cited

U.S. PATENT DOCUMENTS

| | | | | |
|---|---|---|---|---|
| 5,077,885 A | * | 1/1992 | Kanemitsu et al. | 29/469 |
| 5,106,148 A | * | 4/1992 | Ikeda et al. | 296/203.02 |
| 5,123,695 A | * | 6/1992 | Kanemitsu et al. | 296/203.02 |
| 5,271,473 A | * | 12/1993 | Ikeda et al. | 296/203.02 |
| 5,533,780 A | * | 7/1996 | Larson et al. | 296/203.02 |
| 6,205,638 B1 | * | 3/2001 | Yustick | 29/464 |
| 6,375,252 B1 | * | 4/2002 | Cheron et al. | 296/203.02 |
| 6,389,698 B1 | * | 5/2002 | Malatier | 29/897.2 |
| 2003/0019090 A1 | * | 1/2003 | Matsumoto et al. | 29/428 |

FOREIGN PATENT DOCUMENTS

| | | |
|---|---|---|
| EP | 0 320 315 | 6/1989 |
| EP | 1 036 730 A2 | 9/2000 |
| JP | 2001-010534 | 1/2001 |

OTHER PUBLICATIONS

Patent Abstract of Japan, vol. 1999, No. 12, Oct. 29, 1999 & JP 11 198855 A (Nissan Motor Co., Ltd.), Jul. 27 1999.

* cited by examiner

*Primary Examiner*—David P. Bryant
(74) *Attorney, Agent, or Firm*—Foley & Lardner LLP

(57) ABSTRACT

A method of assembling a vehicle body includes a step of positioning a pair of front side members so that a span between the front side members is adjusted at a first design span, a step of connecting a pair of hood-ledge reinforcements with hood ledges fixed to the front side members, respectively, while keeping the first design span, so that a span between each hood-ledge reinforcement and each front side member is substantially equal to a second design span; a step of positioning again the front side members connected to the hood-ledge reinforcements so that the span between the front side members is adjusted at the first design span; and a step of attaching a front-end module to the vehicle body while keeping the first design span.

12 Claims, 8 Drawing Sheets

METHOD FOR ASSEMBLING VEHICLE BODY

BACKGROUND OF THE INVENTION

The present invention relates to a method of assembling a vehicle body, and more particularly to an assembly method of a vehicle body including a front-end module which integrates radiator supports, right-and-left head lamp units and a radiator.

Japanese Patent Provisional Publication No. 2001-10534 discloses a method of attaching a front-end module to front side members. This method is arranged to absorb a relative-position error between the front-end module and the front side members.

SUMMARY OF THE INVENTION

However, this method does not improve dimensional errors of a relative position between the front side members and of positions of various elements in an engine compartment. Therefore, this method requires an assembly-dimension correcting process for correcting the dimensional errors after the installation of the front-end module in the vehicle body is completed.

It is therefore an object of the present invention to provide a vehicle body assembly method which ensures dimensional accuracies among assembled elements when a front-end module is attached to a vehicle body. More specifically, the method is executed upon taking account that a positional error as to a relative position of the right-and-left front side members occurs when the right-and-left front side members are not restrained, and the method reproduces the positional accuracy of the front side members under the complete vehicle condition by executing the positioning of the front side members when a front-end module is attached to the vehicle body.

An aspect of the present invention resides in a method of assembling a vehicle body including a front-end module. The method comprises a step of connecting a pair of hood-ledge reinforcements with hood ledges fixed to a pair of front side members, respectively, so that a positional relationship between each hood-ledge reinforcement and each front side member is substantially equal to a first positional relationship, a step of positioning the front side members so that a positional relationship between the front side members is substantially equal to a second positional relationship, and a step of attaching a front-end module to the vehicle body while keeping the second positional relationship.

Another aspect of the present invention resides in a vehicle-body assembling system which comprises a connecting section that connects a pair of hood-ledge reinforcements with hood ledges fixed to a pair of front side members, respectively, so that a positional relationship between each hood-ledge reinforcement and each front side member is substantially equal to a first positional relationship; a positioning section that positions the front side members so that a positional relationship between the front side members is substantially equal to a second positional relationship; and an attaching section that attaches a front-end module to the vehicle body while keeping the second positional relationship.

A further another aspect of the present invention resides in a method of assembling a vehicle body, which method comprises a step of positioning a pair of front side members so that a span between the front side members is adjusted at a first design span; a step of connecting a pair of hood-ledge reinforcements with hood ledges fixed to the front side members, respectively, while keeping the first design span, so that a span between each hood-ledge reinforcement and each front side member is substantially equal to a second design span; a step of positioning again the front side members connected to the hood-ledge reinforcements so that the span between the front side members is adjusted at the first design span; and a step of attaching a front-end module to the vehicle body while keeping the first design span.

The other objects and features of this invention will become understood from the following description with reference to the accompanying drawings.

DETAILED DESCRIPTION OF THE INVENTION

Referring to FIGS. 1 to 10, there is shown an embodiment of a method of assembling a vehicle body including a front-end module according to the present invention.

Figure 1:
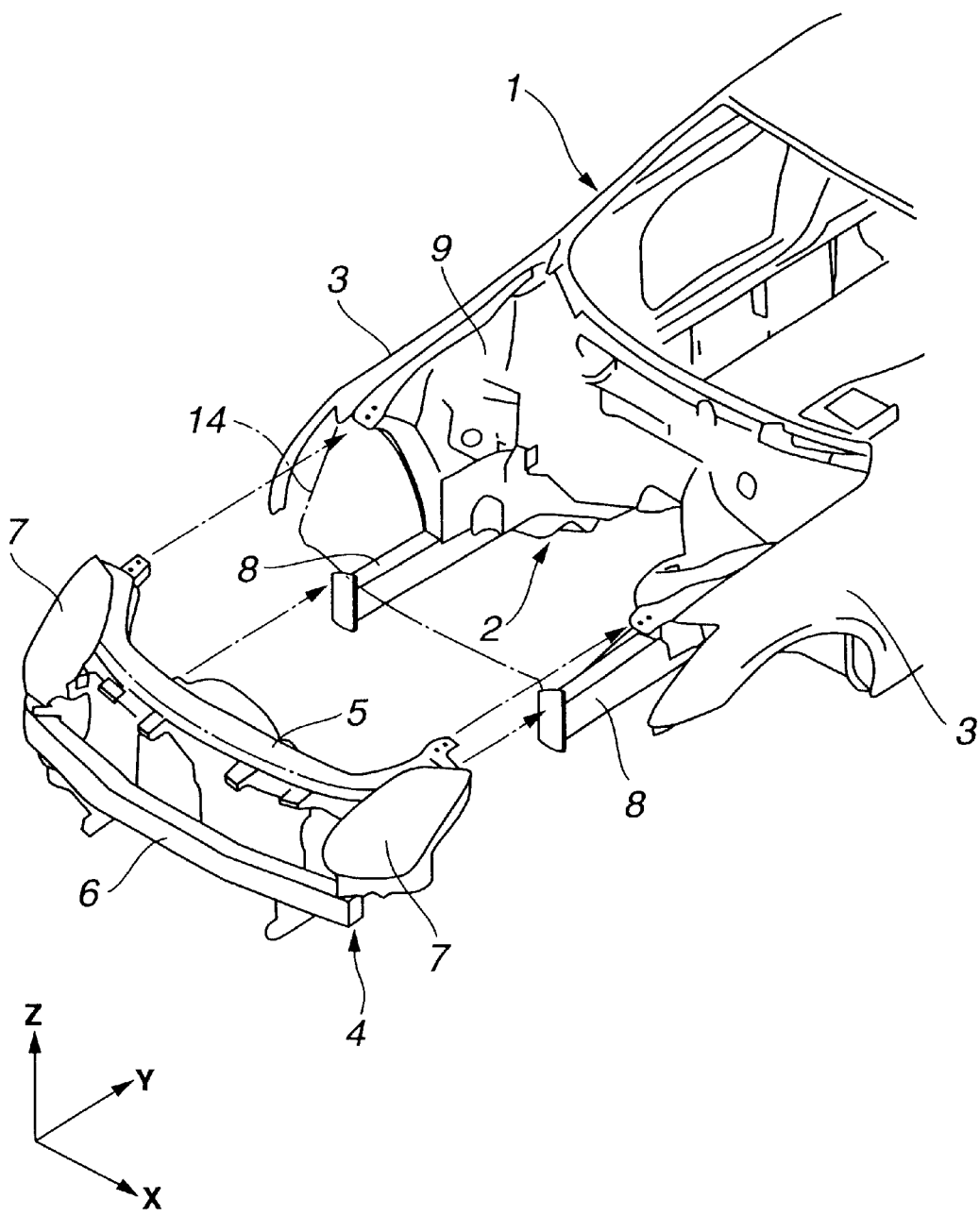
FIG. 1 is a perspective view showing a vehicle body structure including a front-end module according to an embodiment of the present invention.

As shown in FIG. 1, a vehicle body 1 is in turn assembled through a body main process for attaching a body main structural elements such as a floor panel and a body side of vehicle body 1 into vehicle body 1, a metal process for assembling front fenders 3, a hood 14 and doors into vehicle body 1, and a coating process. Thereafter, a front-end module 4 is attached to the vehicle body 1.

Figure 2:
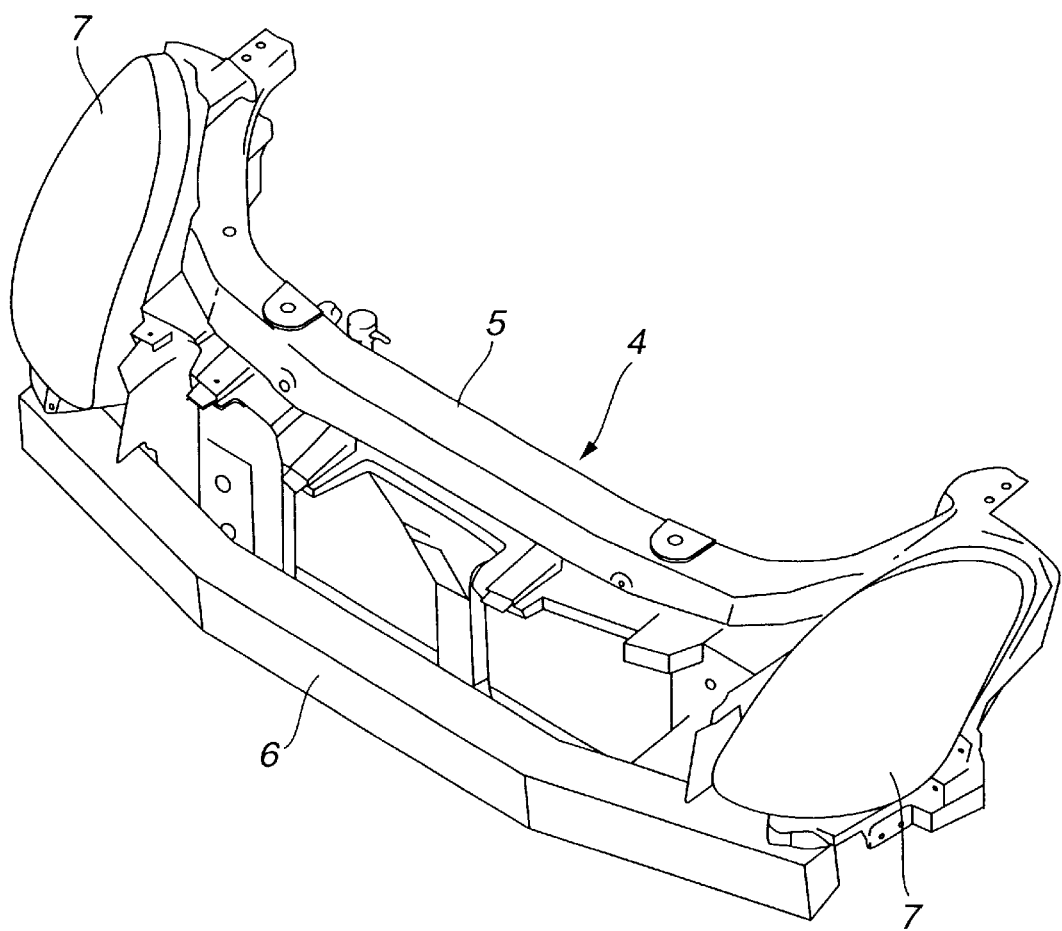
FIG. 2 is an enlarged perspective view of the front-end module of FIG. 1.
Figure 5:
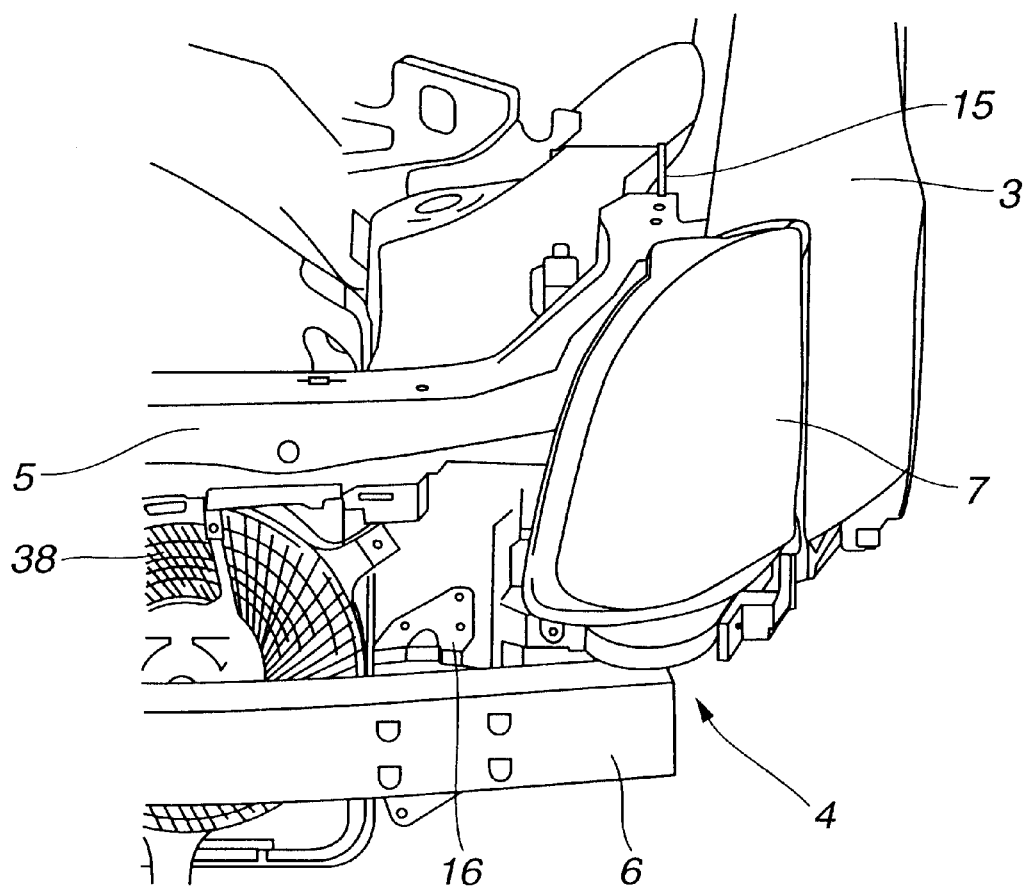
FIG. 5 is a front view of an essential part of the vehicle body to which the front-end module has been attached.

As shown FIG. 2, front-end module 4 is assembled by previously attaching right-and-left head lamp units 7, a radiator 38 shown in FIG. 5 and other accessories to a base member constructed by a radiator support 5 and a bumper reinforcement 6. After the above-mentioned metal elements are assembled into front-end module 4, front-end module 4 is fixed to front side members 8 and hood ledges 9 of engine-compartment construction elements of vehicle body 1 by means of bolts.

Radiator support 5 functions as a frame member of front-end module 4. Accordingly, until front-end module 4 is installed in vehicle body 1, a front portion (engine compartment 2) of vehicle body 1 without front-end module 4 such frame structural members is put in an open structure wherein front-end module 4 has not been yet installed in vehicle body 1. This open structure tends to generate variations in position accuracy of front side members 8, hood ledges 9 to which front fenders 3 are attached.

It is therefore an object of the present invention to ensure a position accuracy of each part of engine compartment 2 during a period of the assembly process of vehicle body 1 and until the installation of front-end module 4, even though the front end of engine compartment 2 is an open structure.

After front-end module 4 is attached to vehicle body 1, a bumper fascia (not shown) is attached to front-end module 4.

Figure 3A:
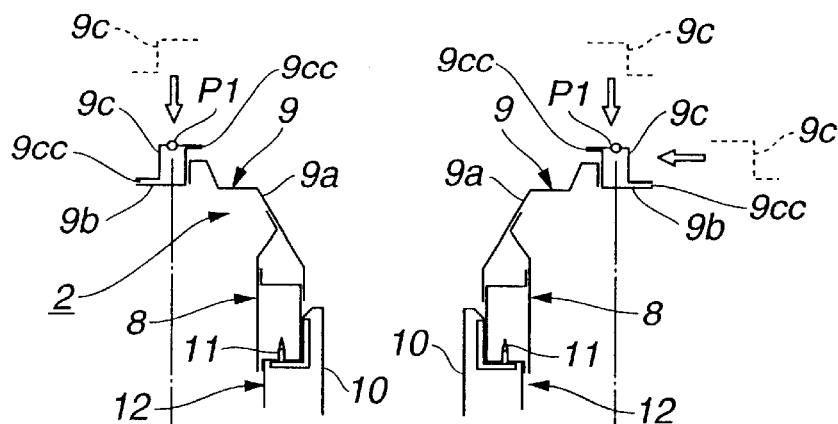
FIGS. 3A through 3D are explanatory views showing vehicle body assembly processes.

FIG. 3A shows a front view of vehicle body 1 during the body main process. The body main process is a process for constructing a frame of vehicle body 1 by assembling engine compartment 2, various panels such as a floor panel (not shown) and body sides into vehicle body 1. Engine compartment 2 has been previously assembled from right-and-left front side members 8 of a closed cross-section structure, hood-ledge lowers 9a and hood-ledge uppers 9b of hood ledges 9.

During the body main process, both front end portions of front side members 8 are positioned at design positions in X, Y and Z three-dimensional directions by using positioning jigs 12, each of which includes a finger 10 and a positioning pin 11. A lateral-side inner surface of each front end portion of front side member 8 is received by finger 10 and positioning pin 11 of positioning jig 12. While keeping this correct positioning of front side members 8, the installation of panels (door and etc.) is executed. With this arrangement, a span S1 between front side members 8 in a vehicle-lateral direction (X-axis direction) is maintained at a preset dimension (design reference value).

Each hood-ledge reinforcement 9c, which constructs a closed cross-section structure by being fixedly connected with each hood-ledge upper 9b, has been previously formed into a crank shape in cross section so that a substantially horizontal connecting-surface 9cc of hood-ledge reinforcement 9c is connected to hood-ledge upper 9b. This previously formed hood-ledge reinforcement 9c is set on hood-ledge upper 9b from the upper direction or the lateral direction of vehicle body 1, and is positioned so that a relative positional relationship between hood-ledge reinforcement 9c and front side member 8 corresponds to a correct value at the time when the vehicle-body assembly process is completed. Then, hood-ledge reinforcement 9c is fixedly connected to hood-ledge upper 9b by means of welding. Hood-ledge reinforcements 9c function as tightening positions P1 of front fenders 3.

With this arrangement, a span S2 between each front side member 8 and fender tightening position P1 is univocally set at a design dimension. Therefore, even if hood-ledge upper 9b or hood-ledge lower 9a has a variation in dimension accuracy, such variation does not affect the span S2. As a result, a span (S1+S2+S2) between fender tightening positions P1 and P1 is set at a design dimension.

Even if span S1 between front side members 8 are varied by detaching positioning jig 12 after hood-ledge reinforcements 9c are respectively welded to hood-ledge uppers 9b, it is possible to justify span S1 thereafter in each process. Therefore, no problem causes in dimension accuracy of vehicle body 1.

According to the method according to the present invention, hood-ledge reinforcements 9c are attached to hood-ledge 9 of vehicle body 1 during the body main process. The reason thereof is that if hood-ledge reinforcements 9c are attached to vehicle body 1 during the engine-compartment assembly process or a floor-main assembly process, degradation or variation of vehicle body 1 occurs in the body main process since the rigidity of vehicle body 1 is not sufficient during the engine-compartment assembly process and the floor-main assembly process.

Further, the method according to the present invention is arranged to connect horizontal surfaces 9cc of hood-ledge reinforcement 9c with hood-ledge upper 9b through one by one fitting step. The reason thereof is that a variation of a vehicle-lateral directional or a horizontal directional dimension accuracy of hood-ledge upper 9b does not affect the positional accuracy of hood-ledge reinforcement 9c.

Figure 3B:
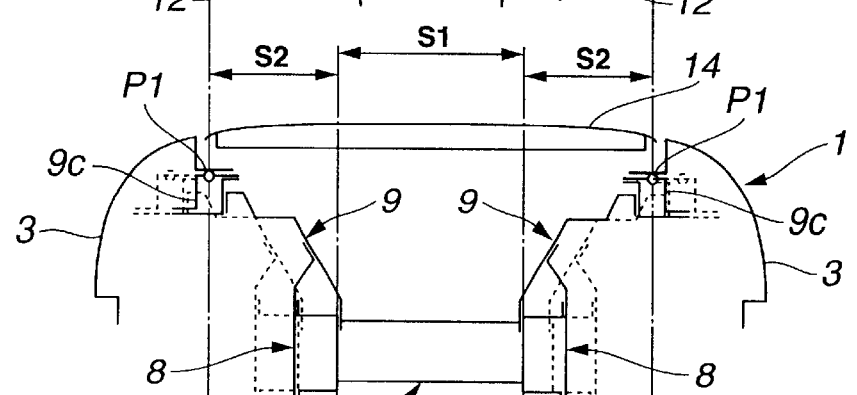

FIG. 3B shows vehicle body 1 during the metal process wherein so-called metal parts such as hood 14 and front fenders 3 are installed in vehicle body 1. In the metal process, a correcting jig 13, which is similar to positioning jig 12, is employed instead of positioning jig 12 shown in FIG. 3A to correct and restrain front side members 8 so that span S1 between front side members 8 is adjusted at the design dimension. With this arrangement, span S1 between front side members 8, both spans S2 and S2 between right front side member 8 and right fender tightening position P1 and between left front side member 8 and left fender tightening position P1, and a total span (S1+S2+S3) between right-and-left tightening position P1 an P1 are repeatedly reproduced so as to be set at design dimensions (design spans).

Under this design-span reproduced condition, hood 14 is fixed to vehicle body 1 by means of bolts, and right-and-left front fenders 3 are fixed at fender tightening positions P1 and P1 by means of bolts.

Figure 3C:
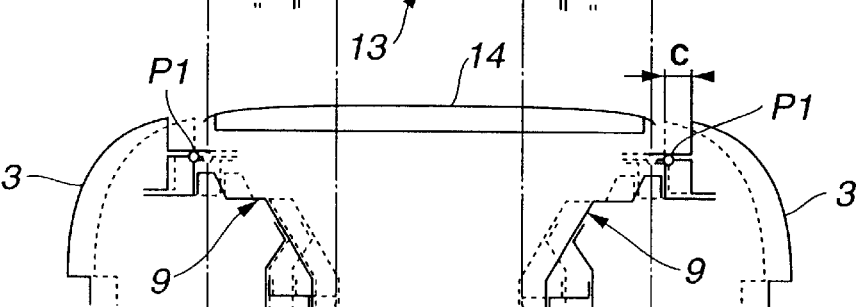
Figure 4:
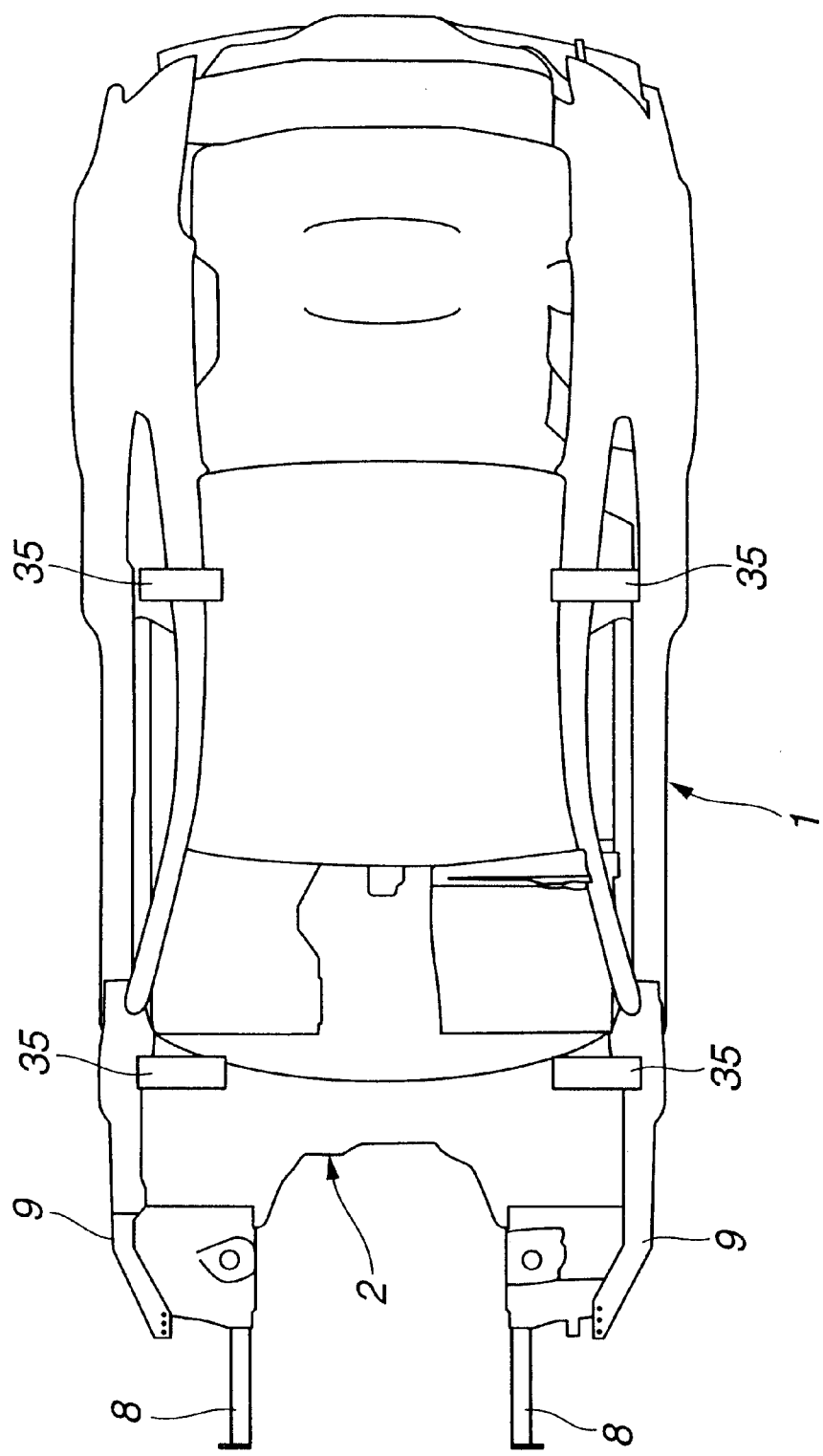
FIG. 4 is a top view showing the vehicle body shown in FIG. 1.

During the metal process, four portions of vehicle body 1 are supported by four catches 35 so that front portions of engine compartment 2, which front portions do not have sufficient strength, are not directly supported, as shown in FIG. 4. Thereafter, vehicle body 1 finished the metal process is coated with a predetermined color in the coating process. Before the coating process, correcting jig 13 is removed from vehicle body 1. Therefore, span S1 between right-and-left front side members 8 may vary or a clearance C of a parting portion between hood 14 and front fender 3 may vary due to the degradation of installation accuracy as shown in FIG. 3C. However, it is not necessary to take a countermeasure against these variations in this coating process.

Figure 3D:
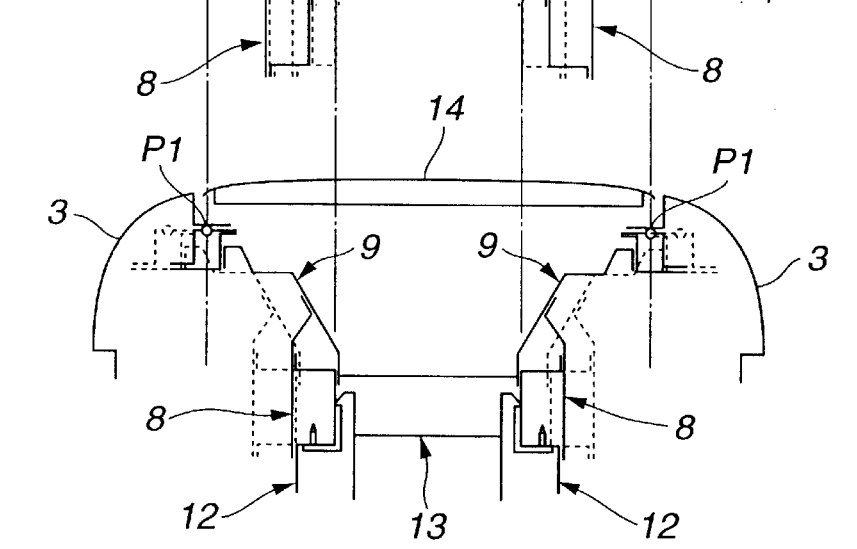

During the vehicle assembly process, front-end module 4, an engine sub-frame, an internal combustion engine and the like are attached to vehicle body 1 which has already finished the coating process. During the vehicle assembly process, a positioning jig 12 as same as jig 12 employed in the body main process showing in FIG. 3A or a correcting jig 13 as same as jig 12 employed in the metal process is employed to restrain both front side members 8 so that span S1 between front side members 8 is set at the design span as shown in FIG. 3D.

With this arrangement, all spans S1 and S2 are again reproduced, and simultaneously the clearance C at the parting portion is suppressed within a predetermined dimension. Therefore, panel members including front fenders 3 and hood 14 are coherently attached to vehicle body 1 while keeping a coherency among panels.

Under this correct-positioning condition, front-end module 4 is attached to vehicle body 1 from a frontward direction, both end portions of front-end module 4 are fixed to hood-ledges 9, and other portions of front-end module 4 are fixed to front side members 8.

After front-end module 4 is installed in vehicle body 1, radiator support 5 functions as a structural member of vehicle body 1. Therefore, the relative position accuracy among panels is also ensured even if positioning jig 12 or correcting jig 13 is removed from vehicle body 1.

When front-end module 4 is attached to vehicle body 4, the positioning of front-end module 4 relative to vehicle body 1 is executed by inserting positioning pins 15 into reference holes previously formed at portions of vehicle body 1 near both front fenders 3 as shown in FIG. 5. More specifically, until an upper portion of front-end module 4 is butted with positioning pins 15 and until brackets 16 provided at lower portions of front-end module 4 are butted with front end surfaces of both front side members 8 respectively, front-end module 4 is pushed from a front side of vehicle body 1 backwardly to set front-end module 4 at a correct position. Then, front-end module 4 is fixed to vehicle body 1 by means of bolts.

Figure 6:
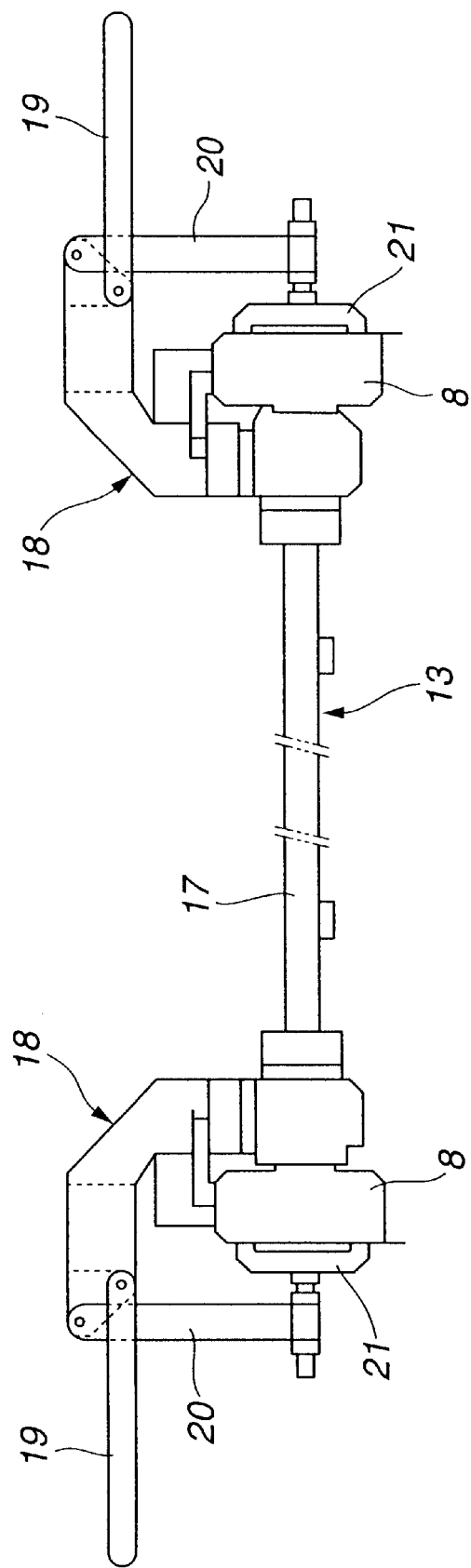
FIG. 6 is a front view showing a correcting jig employed in the assembly process.
Figure 7:
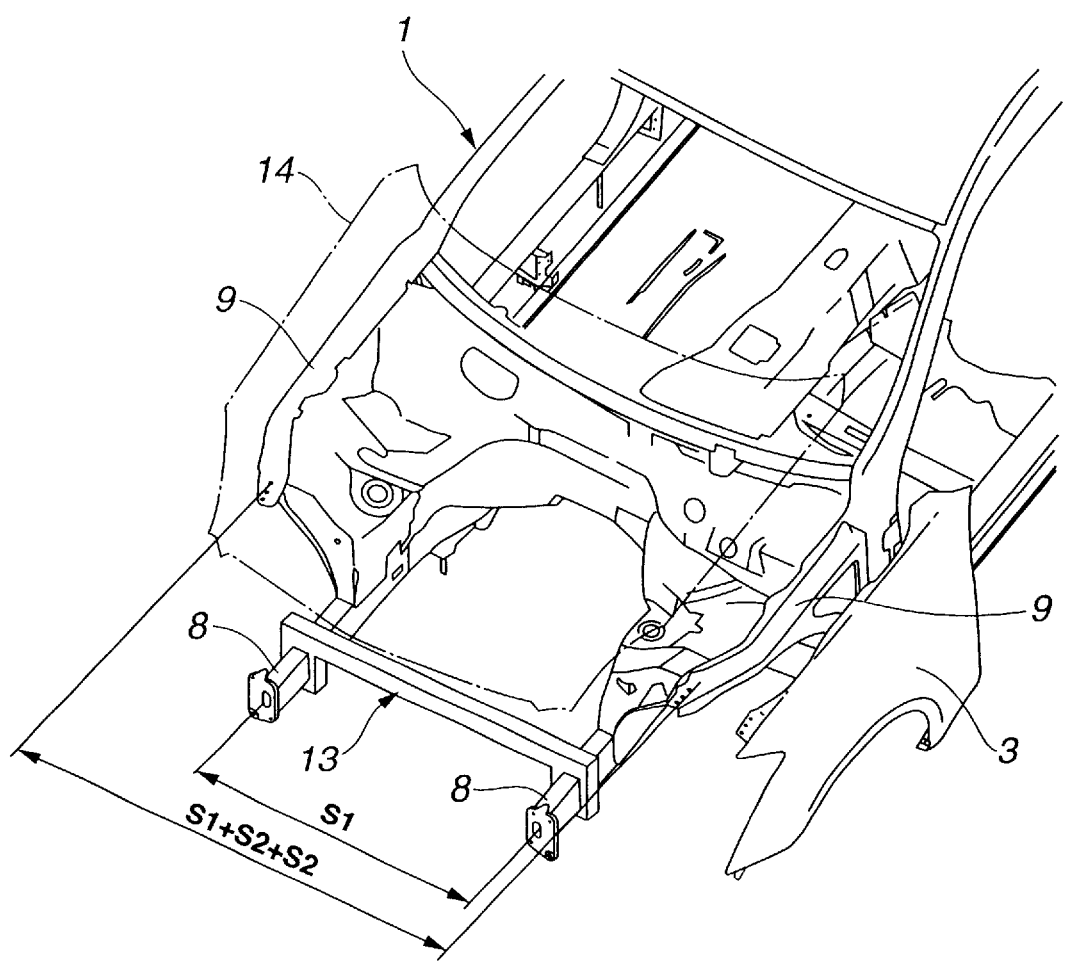
FIG. 7 is a perspective view showing a state that the correcting jig is attached to front side members.

FIGS. 6 and 7 show details of correcting jig 13 of FIG. 3. Correcting jig 13 is constructed by attaching a pair of toggle dampers 18 to both ends of a bar 17 formed into a predetermined length corresponding to the span S1 justified at the design span. A linkage 20 of each toggle damper 18 is swung according to a swing operation of each control lever 19, and each front end portion of each front side member 8 is pressingly clamped between a clamp plate 21 provided at each tip end of linkage 20 and bar 17. Accordingly, by restraining (holding) both front side members 8 and 8 by mean of correcting jig 13 according to the longitudinal dimension of bar 17, the span (S1+S2+S2) between the fender tightening positions P1 and P1 at hood-ledge reinforcements 9c is correctly set at the design span.

Figure 8:
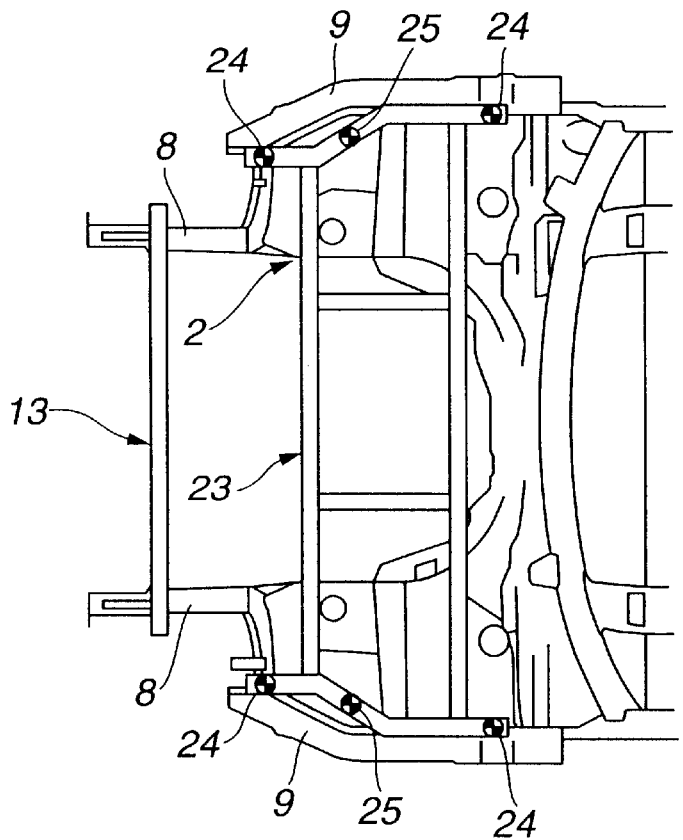
FIG. 8 is a top view showing a modification method wherein the vehicle body is assembled by employing a correcting jig and an assembly-dimension reference jig.
Figure 9:
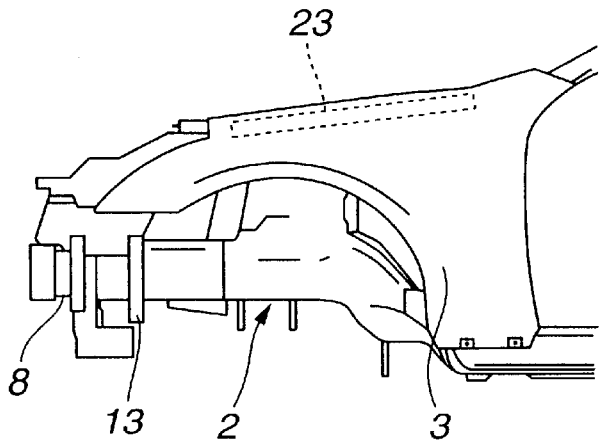
FIG. 9 is a side view of FIG. 8.
Figure 10:
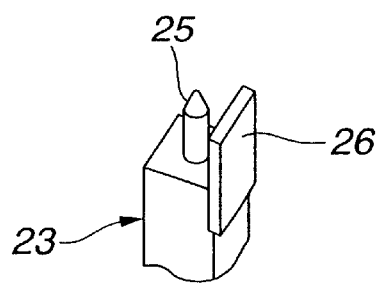
FIG. 10 is a perspective view showing a modification of the assembly-dimension reference jig shown in FIG. 8.

FIGS. 8 and 9 show a modification of the method of assembling vehicle body 1 including front-end module 4. In this modified method, another assembly-dimension reference jig 23 is employed in combination with the above-discussed correcting jig 13. Assembly-dimension reference jig 23 is formed into a frame and comprises a plurality of locating pins 24 engaged with locating holes of engine compartment 2 and a plurality of locating pins 25 engaged with locating holes of hood 14. Accordingly, when hood 14 is attached to vehicle body 1, assembly-dimension reference jig 23 is set on engine compartment 2 of vehicle body 1, and the positioning of hood 14 relative to vehicle body 1 is executed with reference to the position of assembly-dimension reference jig 23. Further, hinges of hood 14 are fixed to vehicle body 1 while the positioning of hood 14 relative to assembly-dimension reference jig 23 is maintained. With these steps, the assembly-dimension accuracy of hood 14 relative to vehicle body 1 is further improved. In this modified case, a gage 26 for restricting a clearance between hood 14 and each front fender 3 may be provided in assembly-dimension reference jig 23 in addition to locating pins 25 for positioning hood 14 relative to vehicle body 1. Further, correcting jig 13 and assembly-dimension reference jig 23 may be integrally formed.

That is, the inventor of the present invention found that hood-ledge reinforcements 9c are very important parts functioning as a tightening portion of front fenders 3 and front-end module 4, as a result of various studies and examinations. On the basis of this find, the method of assembling vehicle body 1 as discussed above has been developed.

With this method according to the present invention, regardless a variation of span between front side members 8, the relative positional accuracy between each front side member 8 and each hood-ledge reinforcement 9c is ensured. More specifically, hood-ledge reinforcements 9c are connected to hood ledge 9 by means of welding while keeping the relative position relationship between hood-ledge reinforcement 9c and front side member 8 under a complete vehicle condition. Further, hood-ledge reinforcement 9c has horizontal connecting surface 9cc which is connected to hood-ledge upper 9b. Therefore, an adjustment as to a horizontal-direction relative position relationship of hood-ledge reinforcement 9c relative to hood-ledge upper 9b is easily executed. Furthermore, when front-end module 4 is installed in vehicle body 1, front side members 8 have been previously positioned at the design reference positions. Accordingly, the relative positional relationship between each hood-ledge reinforcement 9c and each front side member 8 under a complete vehicle condition is reproduced (repeatedly realized). Consequently, front-end module 4 is attached to vehicle body 1 under this reproduced correct relative-position relationship. This assembly method according to the present invention ensures the relative positional relationship between each hood-ledge reinforcement 9c and each front side member 8 and the assembly position accuracy of front-end module 4 relative to vehicle body 1.

Furthermore, when front side members 8 are positioned at the design reference positions, by using a jig for positioning the lateral inner side of each front side members 8 at the design position, the span S1 between the inner surfaces 8a of front side members 8 and the relative position relationship between each front side member 8 and each hood-ledge reinforcement 9c in the complete vehicle body are easily and correctly reproduced (repeatedly realized).

With the thus arranged method according to the present invention, it becomes possible that vehicle body 1 employing a front-end module installation structure achieves a dimensional accuracy corresponding to a dimensional accuracy of a vehicle body without employing a front-end module. Further, since the assembly failure of front-end module 4 or front fender 3 is previously prevented by employing the method according to the present invention, it becomes possible to improved the assembly accuracy of front-end module 4 and front fenders 3 relative to vehicle body 1. Furthermore, it becomes possible to eliminate a dimensional adjustment as to clearances among panels after the completion of the vehicle body assembly. This largely improves an external appearance of the vehicle body.

Additionally, by connecting horizontal connecting surface 9cc of hood-ledge reinforcement 9c with hood-ledge upper 9b, it becomes possible to ensure an advantage of easily justifying a horizontal relative position of hood-ledge reinforcement 9c relative to hood-ledge upper 9b. Further, since front side members 8 are positioned at the design reference positions by using a positioning jig for positioning a laterally inner surface 8a of each front side member 8, the span S1 between front side members 8 and the relative position relationship between each front side member 8 and each hood-ledge reinforcement 9c under the complete vehicle condition are easily and accurately reproduced.

This application is based on Japanese Patent Applications No. 2001-185857 filed on Jun. 20, 2001 in Japan. The entire contents of this Japanese Patent Application is incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A method of assembling a vehicle body, comprising:

connecting a pair of hood-ledge reinforcements with hood ledges fixed to a pair of front side members, respectively, so that a positional relationship between each hood-ledge reinforcement and each front side member is substantially equal to a first positional relationship;

positioning the front side members so that a positional relationship between the front side members is substantially equal to a second positional relationship; and attaching a front-end module to the vehicle body while keeping the second positional relationship.

2. The method as claimed in claim 1, wherein the ledge reinforcement has a substantially horizontal connecting-surface through which the hood-ledge reinforcement is connected to a hood-ledge upper of the hood ledge.

3. The method as claimed in claim 2, wherein the hood-ledge upper has a fender connecting-surface which is parallel to the substantially horizontal connecting-surface and through which the hood-ledge upper is connected to a fender.

4. The method as claimed in claim 1, wherein a jig for positioning a laterally inner portion of each of the front side members at a design position is employed when the front side members are positioned so as to satisfy the second positional relationship.

5. The method as claimed in claim 1, wherein the front-end module includes a radiator support, a radiator and right-and-left head lamp units, and is attached to the vehicle body from a direction of a front side of the vehicle body.

6. The method as claimed in claim 1, wherein connecting the hood-ledge reinforcement with the hood ledge includes positioning the front side members at predetermined positions so as to satisfy the second positional relationship.

7. The method as claimed in claim 1, wherein the first positional relationship is a design relationship between the hood-ledge reinforcement and the front side member under a complete vehicle condition that an assembly of the vehicle body is completed.

8. The method as claimed in claim 1, wherein the hood-ledge reinforcement is connected to a front fender.

9. The method as claimed in claim 1, further comprising attaching a hood to the vehicle body while keeping the second positional relationship.

10. The method as claimed in claim 1, further comprising coating the vehicle body without keeping the second positional relationship.

11. A method of assembling a vehicle body, comprising:

positioning a pair of front side members so that a span between the front side members is adjusted at a first design span;

connecting a pair of hood-ledge reinforcements with hood ledges fixed to the front side members, respectively, while keeping the first design span, so that a span between each hood-ledge reinforcement and each front side member is substantially equal to a second design span;

positioning again the front side members connected to the hood-ledge reinforcements so that the span between the front side members is adjusted at the first design span; and attaching a front-end module to the vehicle body while keeping the first design span.

12. The method as claimed in claim 11, wherein coating the vehicle body is executed after connecting the hood-ledge reinforcements and before positioning again the front side members.

* * * * *